(12) United States Patent
Yang

(10) Patent No.: US 11,074,317 B2
(45) Date of Patent: Jul. 27, 2021

(54) SYSTEM AND METHOD FOR CACHED CONVOLUTION CALCULATION

(71) Applicant: Samsung Electronics Co., Ltd., Suwon-si (KR)

(72) Inventor: Duanduan Yang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 16/352,057

(22) Filed: Mar. 13, 2019

(65) Prior Publication Data

US 2020/0142948 A1 May 7, 2020

Related U.S. Application Data

(60) Provisional application No. 62/757,103, filed on Nov. 7, 2018.

(51) Int. Cl.
*G06F 17/00* (2019.01)
*G06F 17/15* (2006.01)
(Continued)

(52) U.S. Cl.
CPC ............ *G06F 17/15* (2013.01); *G06F 16/243* (2019.01); *G06F 16/24539* (2019.01);
(Continued)

(58) Field of Classification Search
CPC ...... G06N 3/0454; G06N 3/02; G06N 3/0445; G06F 16/243; G06F 16/24539;
(Continued)

(56) References Cited

U.S. PATENT DOCUMENTS 5,822,606 A * 10/1998 Morton ................. G06F 9/3887
712/16
6,088,783 A * 7/2000 Morton ................. G06F 9/3802
712/203
(Continued)

OTHER PUBLICATIONS

Wang, Y., Zhang, M., & Yang, J. (Jun. 2017). Towards memory-efficient processing-in-memory architecture for convolutional neural networks. In Proceedings of the 18th ACM SIGPLAN/SIGBED Conference on Languages, Compilers, and Tools for Embedded Systems (pp. 81-90). (Year: 2017).*
(Continued)

*Primary Examiner* — Edgar X Guerra-Erazo

(57) ABSTRACT

A method includes identifying, using at least one processor, input words associated with a user query. The method also includes, for each of one or more of the input words that are contained in a high-frequency word set, retrieving pre-computed element-wise products associated with the input word from a cache. The method further includes performing, using the at least one processor, a convolution operation using the pre-computed element-wise products. In addition, the method includes generating, using the at least one processor, a response to the user query based on results of the convolution operation. The method may also include, for each of one or more of the input words that are not contained in the high-frequency word set, calculating additional element-wise products associated with the input word, and the convolution operation may be performed using the pre-computed element-wise products and the additional element-wise products.

20 Claims, 9 Drawing Sheets

(51) Int. Cl.
| | |
|---|---|
| *G06N 3/02* | (2006.01) |
| *G06F 17/16* | (2006.01) |
| *G06K 9/62* | (2006.01) |
| *G06F 16/953* | (2019.01) |
| *G06F 40/20* | (2020.01) |
| *G06F 16/2453* | (2019.01) |
| *G06F 16/242* | (2019.01) |

(52) U.S. Cl.
CPC ............ *G06F 16/953* (2019.01); *G06F 17/16* (2013.01); *G06F 40/20* (2020.01); *G06K 9/6267* (2013.01); *G06N 3/02* (2013.01)

(58) Field of Classification Search
CPC .. G06F 16/334; G06F 16/335; G06F 16/5846; G06F 16/953; G06F 17/15; G06F 17/16; G06F 40/20
See application file for complete search history.

(56) References Cited

U.S. PATENT DOCUMENTS

| | | | |
|---|---|---|---|
| 9,176,941 B2 | 11/2015 | Xiao | |
| 9,799,333 B2 | 10/2017 | Kintzley et al. | |
| 10,262,654 B2* | 4/2019 | Hakkani-Tur | G06F 40/35 |
| 10,417,555 B2* | 9/2019 | Brothers | G06N 3/04 |
| 2008/0162118 A1 | 7/2008 | Itoh et al. | |
| 2015/0278200 A1* | 10/2015 | He | G06F 40/194 |
| | | | 704/2 |
| 2016/0019459 A1 | 1/2016 | Audhkhasi et al. | |
| 2016/0045142 A1 | 2/2016 | Morita et al. | |
| 2017/0092264 A1* | 3/2017 | Hakkani-Tur | G06N 3/084 |
| 2017/0132496 A1 | 5/2017 | Shoaib et al. | |
| 2018/0190284 A1 | 7/2018 | Singh | |
| 2018/0276527 A1 | 9/2018 | Motoya et al. | |
| 2019/0095806 A1* | 3/2019 | Martinez Canedo | |
| | | | G06F 16/9024 |
| 2019/0108444 A1* | 4/2019 | Song | G06N 3/0481 |
| 2019/0228763 A1* | 7/2019 | Czarnowski | G06N 3/063 |
| 2019/0243755 A1* | 8/2019 | Luo | G06N 3/04 |
| 2020/0019851 A1* | 1/2020 | Mehrabian | G06N 3/0675 |
| 2020/0174686 A1* | 6/2020 | Song | G06N 3/04 |

OTHER PUBLICATIONS

L. Song, Y. Zhang and Y. Hou, "Convolutional neural network with pair-wise pure dependence for sentence classification," 2018 International Conference on Artificial Intelligence and Big Data (ICAIBD), Chengdu, China, 2018, pp. 117-121 (Year: 2018).*

Severyn, A., & Moschitti, A. (Aug. 2015). Learning to rank short text pairs with convolutional deep neural networks. In Proceedings of the 38th international ACM SIGIR conference on research and development in information retrieval (pp. 373-382). (Year: 2015).*

Yang et al., "Event Detection with Convolutional Neural Networks for Forensic Investigation", 9th International Conference on Intelligent Information Processing, Nov. 2016, 11 pages.

Young et al., "Recent Trends in Deep Learning Based Natural Language Processing", IEEE Computational Intelligence Magazine, Aug. 2018, p. 55-75.

International Search Report and Written Opinion of the International Searching Authority dated Feb. 18, 2020 in connection with International Patent Application No. PCT/KR2019/014946, 9 pages.

* cited by examiner

| Key | Value |
|---|---|
| [Word$_0$, 0] | H(0,0) |
| [Word$_0$, 1] | H(0,1) |
| .... | |
| [Word$_0$, n] | H(0,n) |
| [Word$_1$, 0] | H(1,0) |
| [Word$_1$, 1] | H(1,1) |
| ... | ... |
| [Word$_1$, n] | H(1,n) |
| ... | ... |
| [Word$_m$, 0] | H(m,0) |
| [Word$_m$, 1] | H(m,1) |
| ... | ... |
| [Word$_m$, n] | H(m,n) |

FIG. 5

SYSTEM AND METHOD FOR CACHED CONVOLUTION CALCULATION

CROSS-REFERENCE TO RELATED APPLICATION AND PRIORITY CLAIM

This application claims priority under 35 U.S.C. § 119(e) to U.S. Provisional Patent Application No. 62/757,103 filed on Nov. 7, 2018, which is hereby incorporated by reference in its entirety.

TECHNICAL FIELD

This disclosure relates generally to natural language processing. More specifically, this disclosure relates to a system and method for cached convolution calculation.

BACKGROUND

Natural language processing generally refers to machine learning technology or other computing technology that supports interactions between humans and machines using natural language. When natural language processing is used to interpret utterances or other queries from users, the interpretations are often determined using word embedding layers and convolution layers. Words can be represented as vectors in the word embedding layers, and calculations can be performed using the vectors in the word embedding layers and convolution filters in the convolution layers.

SUMMARY

This disclosure provides a system and method for cached convolution calculation.

In a first embodiment, a method includes determining, using at least one processor, input words associated with a user query. The method also includes, for each of one or more of the input words that are contained in a high-frequency word set, retrieving pre-computed element-wise products associated with the input word from a cache. The method further includes performing, using the at least one processor, a convolution operation using the pre-computed element-wise products. In addition, the method includes generating, using the at least one processor, a response to the user query based on results of the convolution operation.

In a second embodiment, an apparatus includes at least one memory configured to store a high-frequency word set and a cache of pre-computed element-wise products associated with words in the high-frequency word set. The apparatus also includes at least one processor coupled to the at least one memory and configured to determine input words associated with a user query. The at least one processor is also configured, for each of one or more of the input words that are contained in the high-frequency word set, to retrieve the pre-computed element-wise products associated with the input word from the cache. The at least one processor is further configured to perform a convolution operation using the pre-computed element-wise products and generate a response to the user query based on results of the convolution operation.

In a third embodiment, a non-transitory computer readable medium contains computer readable program code that, when executed, causes an electronic device to determine input words associated with a user query. The medium also contains computer readable program code that, when executed, causes the electronic device, for each of one or more of the input words that are contained in a high-frequency word set, to retrieve pre-computed element-wise products associated with the input word from a cache. The medium further contains computer readable program code that, when executed, causes the electronic device to perform a convolution operation using the pre-computed element-wise products and generate a response to the user query based on results of the convolution operation.

In a fourth embodiment, a method includes identifying, using at least one processor, multiple words associated with multiple user queries. The method also includes generating, using the at least one processor, a high-frequency word set based on the words associated with the user queries, where the high-frequency word set identifies more frequently-used words in the user queries. The method further includes calculating, using the at least one processor, element-wise products associated with the words in the high-frequency word set and convolution filters and storing the calculated element-wise products. In addition, the method includes, using the at least one processor, at least one of (i) using the stored element-wise products to process additional user queries and generate responses for the additional user queries and (ii) providing the stored element-wise products to one or more devices configured to process the additional user queries and generate the responses for the additional user queries.

In a fifth embodiment, an apparatus includes at least one memory and at least one processor coupled to the at least one memory and configured to perform the method of the fourth aspect or any of its dependent claims. In a sixth embodiment, a non-transitory computer readable medium contains computer readable program code that, when executed, causes an electronic device to perform the method of the fourth aspect or any of its dependent claims.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 5 illustrates an example database table for caching convolution calculation results in accordance with this disclosure;

DETAILED DESCRIPTION

Figure 1:
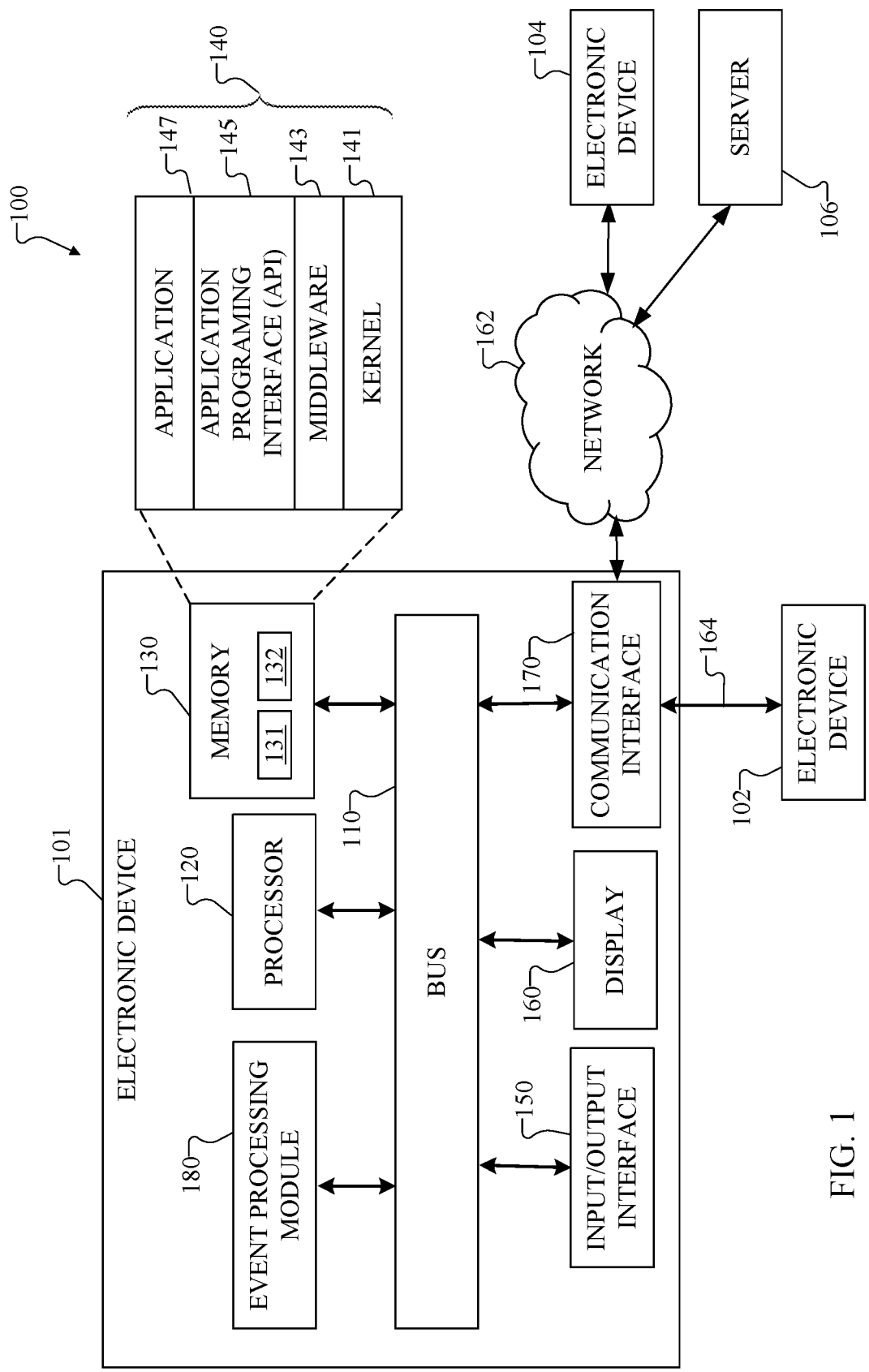
FIG. 1 illustrates an example network configuration in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, when natural language processing is used to interpret utterances or other queries from users, the interpretations are often determined using word embedding layers and convolution layers. Words can be represented as vectors in the word embedding layers, and calculations can be performed using the vectors in the word embedding layers and convolution filters in the convolution layers. Often times, the width of the convolution filters matches the size of the word embedding vectors, which enables computations such as Hadamard products or other element-wise products to be calculated and used during convolution operations. The calculation of a Hadamard product or other element-wise product for a single word may involve multiple multiplication operations. As a result, it can be computationally expensive to determine element-wise products repeatedly when performing natural language processing.

One common use of natural language processing is with digital or intelligent assistants on smartphones, tablet computers, and other electronic devices. These digital or intelligent assistants typically receive user queries, use natural language processing to determine the meanings of the user queries (or interact with other devices like servers that use natural language processing), and provide responses to the user queries. Across a large number of users, it is common for multiple user queries submitted using various electronic devices to include common words or phrases. For example, many users may submit queries asking the same or similar questions in response to recent events. Because of this, when a trending event occurs, various words may repeatedly occur in user queries.

This disclosure provides techniques for using cached convolution calculation results to help speed up natural language processing and response generation for user queries. Among other things, this is accomplished by caching intermediate convolutional results (such as Hadamard products or other element-wise products) associated with convolution operations. For example, a high-frequency word set (HFWS) can be generated and updated in real-time, where the high-frequency word set identifies more frequently-used words in user queries for a given time period. The words in the high-frequency word set can be converted into vectors, and Hadamard products or other element-wise products between the vectors and rows in convolutional filters can be calculated and cached (such as into memory or disk storage). When the element-wise products or other intermediate convolutional results are actually needed, the results can be obtained from the cache, and accumulations or other operations can be performed to complete the convolution operations.

In this way, at least some of the multiplication operations or other operations needed during convolution operations can be performed ahead of time, and their results can later be retrieved from a cache (rather than being performed at that time). This allows the convolution operations to be completed more quickly. By completing the convolution operations faster, responses to user queries can be generated and provided to users more quickly. As a result, average response times for digital or intelligent assistants or other natural language-based applications can be improved. In some cases, for example, the average response times for natural language-based applications can be cut in half or reduced even more. Improved responsiveness is often highly desired by users of natural language-based applications like digital or intelligent assistants. Moreover, since fewer computations are required, reductions in cost, energy usage, or other factors associated with operating servers or other devices that perform the computations can be achieved.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

As described in more detail below, at least one device of the network configuration 100 (such as an electronic device 101, 102, 104 or server 106) performs convolution operations to process user queries in order to support natural language processing or other operations. In order to help speed up the convolution operations, the memory 130 of the at least one device could include at least one high-frequency word set (HFWS) 131 and at least one cache 132. The high-frequency word set 131 identifies more frequently-used words contained in user queries, and partial convolution results (such as Hadamard products or other element-wise products) associated with the words in the high-frequency word set 131 are stored in the cache 132. During convolution operations, if words being processed are contained in the high-frequency word set 131, the associated partial convolution results are retrieved from the cache 132 and used to complete the convolution operations. As noted above, this can help to reduce the time needed to perform the convolution operations and thus reduce the time needed to generate responses to user queries.

Also, as described in more detail below, at least one device of the network configuration 100 (such as an electronic device 101, 102, 104 or server 106) performs operations to generate or update a high-frequency word set 131 and to generate or update a cache 132 containing partial convolution results associated with the words in the high-frequency word set 131. If the at least one device that maintains/updates the high-frequency word set 131 and the partial convolution results does not process user queries, the high-frequency word set and the partial convolution results can be pushed or otherwise provided to the devices that process user queries and perform the convolution operations.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
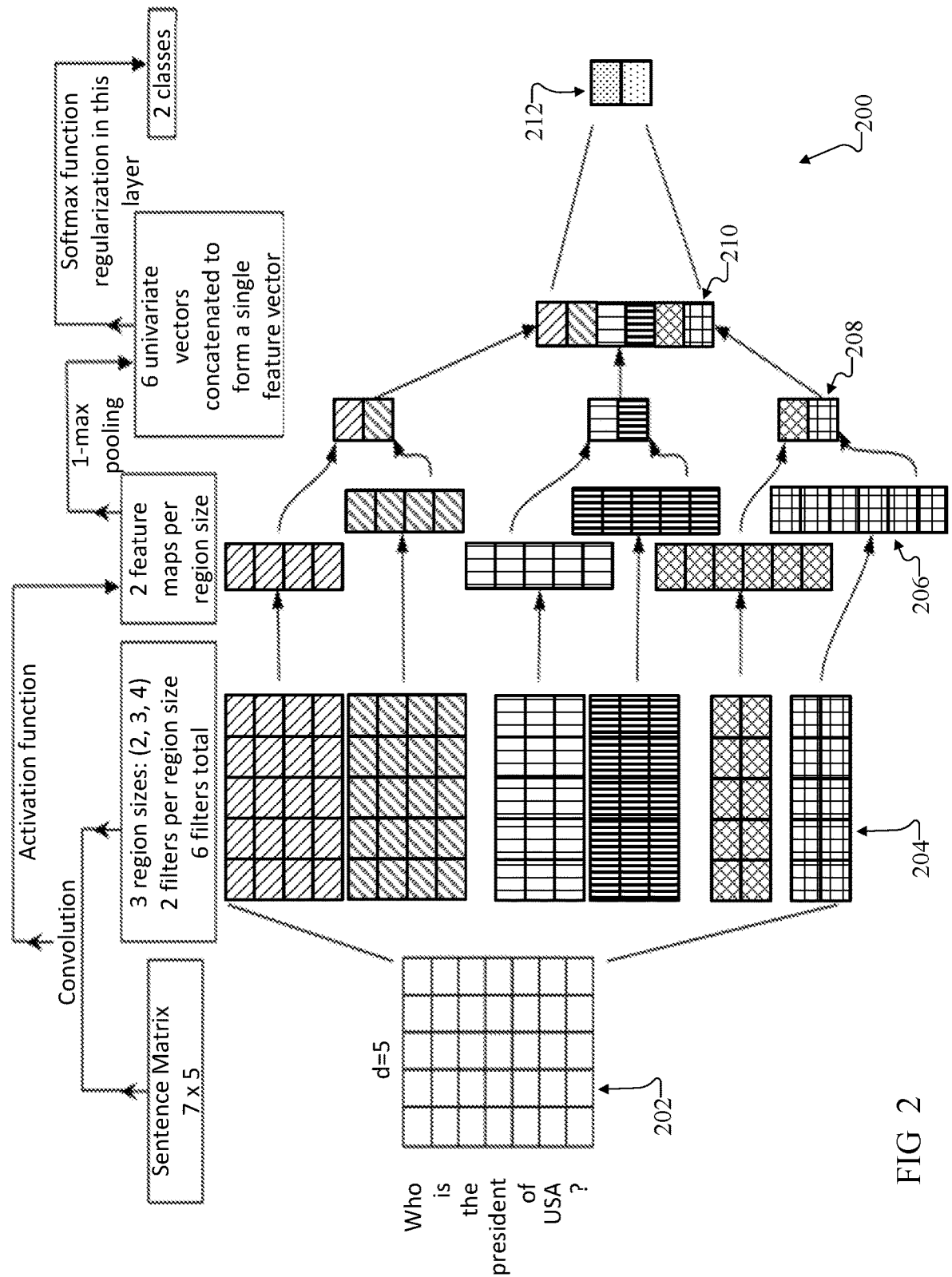
FIG. 2 illustrates an example framework for natural language processing in accordance with this disclosure.

FIG. 2 illustrates an example framework 200 for natural language processing in accordance with this disclosure. For ease of explanation, the framework 200 shown in FIG. 2 may be described as being performed using at least one device of the network configuration 100 shown in FIG. 1 (such as the electronic device 101, 102, 104 or server 106). However, the framework 200 shown in FIG. 2 may be performed using any other suitable device in any other suitable system.

As shown in FIG. 2, the framework 200 receives a sentence matrix 202, which generally represents words, punctuation, or other components of a user query that are defined as vectors in a word embedding layer. Each vector in the sentence matrix 202 is represented using a different row in the sentence matrix 202. Word embedding layers are generally used to map words to numeric vectors, and the use of word embedding layers with vectors representing words is well-known in the art. In this example, the user query has seven components, each of which is represented using a five-dimensional vector in a word embedding layer. Of course, the number of components in the user query varies based on the query, and the number of dimensions of the vectors can vary as needed or desired.

The framework 200 also includes a convolution layer having a number of convolutional filters 204 (which may also be referred to as kernels). The convolutional filters 204 are multiplied with the vectors in the sentence matrix 202 to produce activation maps of the convolutional filters 204. With a properly-trained convolution layer, the convolutional filters 204 are activated when specific types of features are detected in the input (the sentence matrix 202). In this example, there are six convolutional filters 204 having three different sizes. Of course, the number of convolutional filters 204 and the size(s) of the convolutional filters 204 can vary as needed or desired.

The activation maps for the convolutional filters 204 are stacked to form feature maps 206. Each feature map 206 includes one entry (a vector) for each product obtained by multiplying one of the vectors in the sentence matrix 202 against one of the rows of the convolutional filters 204. In this example, two feature maps 206 are generated for each size of the convolutional filters 204, although other numbers of feature maps 206 may be generated for each size of the convolutional filters 204. The feature maps 206 undergo max pooling (such as 1-max pooling), which effectively down-samples the feature maps 206 to produce feature maps 208. The feature maps 208 collectively include one entry (a vector) associated with each convolutional filter 204. The feature maps 208 are concatenated or stacked to produce a feature vector 210, which includes one entry (a vector) associated with each convolutional filter 204. Note that the sizes of the feature maps 206, 208 and feature vectors 210 can be based on various factors (such as the number of convolutional filters 204 used), so these sizes can vary as needed or desired. A loss function is applied to the feature vector 210 to generate a feature vector 212, which represents the final result of the convolution operation. In this example, the loss function is implemented as a softmax regularization function, although other functions could also be used here.

During convolution operations, vectors (rows) contained in the sentence matrix 202 are multiplied in an element-wise manner with rows of the convolutional filters 204 to produce the feature maps 206. The results of the element-wise multiplications are referred to as element-wise products.

"Element-wise" refers to the fact that the value in each position of a first vector/matrix is multiplied against the value in the same position in a second vector/matrix, and the resulting product is stored in the same position in a third vector/matrix. A Hadamard product is one example type of an element-wise product. When dealing with vectors, this could be expressed as follows:

$$\begin{bmatrix} a_1 \\ a_2 \\ \vdots \\ a_n \end{bmatrix} \odot \begin{bmatrix} b_1 \\ b_2 \\ \vdots \\ b_n \end{bmatrix} = \begin{bmatrix} a_1 \times b_1 \\ a_2 \times b_2 \\ \vdots \\ a_n \times b_n \end{bmatrix} \quad (1)$$

During the convolution operations, different element-wise products are calculated and then summed or accumulated to form the entries in the feature maps 206.

Figure 3:
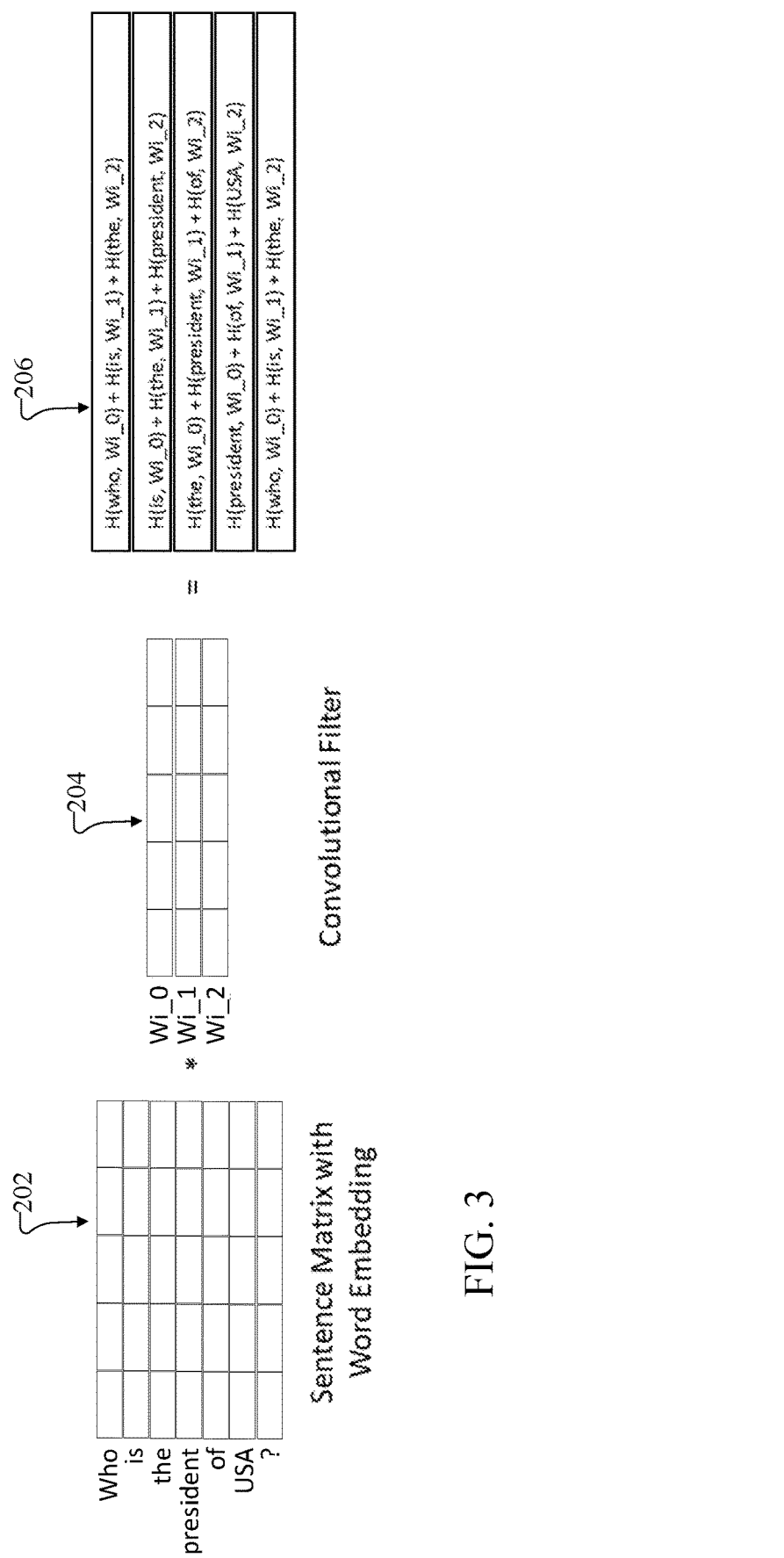
FIG. 3 illustrates example convolution calculations for use in natural language processing in accordance with this disclosure.

FIG. 3 illustrates example convolution calculations for use in natural language processing in accordance with this disclosure. In particular, FIG. 3 illustrates how the sentence matrix 202 shown in FIG. 2 can be multiplied in an element-wise manner with one of the convolutional filters 204 shown in FIG. 2 and how the results can be accumulated to form one of the feature maps 206 shown in FIG. 2. In FIG. 3, the notation "H(i, j)" refers to the Hadamard product obtained using an $i^{th}$ word vector (from the sentence matrix 202) and the $j^{th}$ filter row (from the convolutional filter 204).

As shown in FIG. 3, the top entry in the feature map 206 is determined as the accumulation of three Hadamard products, namely one involving the first word of the sentence matrix 202 (who) and the first row of the convolutional filter 204 (Wi_0), one involving the second word of the sentence matrix 202 (is) and the second row of the convolutional filter 204 (Wi_1), and one involving the third word of the sentence matrix 202 (the) and the third row of the convolutional filter 204 (Wi_2). The second entry in the feature map 206 is determined as the accumulation of three Hadamard products, namely one involving the second word of the sentence matrix 202 (*is*) and the first row of the convolutional filter 204 (Wi_0), one involving the third word of the sentence matrix 202 (the) and the second row of the convolutional filter 204 (Wi_1), and one involving the fourth word of the sentence matrix 202 (president) and the third row of the convolutional filter 204 (Wi_2). The third entry in the feature map 206 is determined as the accumulation of three Hadamard products, namely one involving the third word of the sentence matrix 202 (the) and the first row of the convolutional filter 204 (Wi_0), one involving the fourth word of the sentence matrix 202 (president) and the second row of the convolutional filter 204 (Wi_1), and one involving the fifth word of the sentence matrix 202 (of) and the third row of the convolutional filter 204 (Wi_2). This pattern continues until the last entry of the feature map 206, which matches the first entry in this example.

As can be seen here, the computation of a final convolution result (the feature vector 212) can involve a large number of mathematical operations. For example, the calculation of the single feature map 206 in FIG. 3 requires the computation of twelve distinct Hadamard products or other element-wise products. If each Hadamard product or other element-wise product requires five multiplication operations (as shown in the example in FIGS. 2 and 3), the calculation of the feature map 206 in FIG. 3 requires sixty different multiplication operations. Thus, the overall process shown in FIG. 2 may require a huge number of multiplication operations when performed for different user queries over time.

This disclosure recognizes that high-frequency words represented in various sentence matrices 202 may be repeatedly convolved with the convolutional filters 204. For example, some words may repeatedly occur in various user queries, such as when user queries are made in response to recent or other trending events. Under normal circumstances, each time a user query includes these repeated words, the words are converted into vectors by word embedding, and the element-wise products between the vectors in the sentence matrix 202 and the rows of the convolutional filters 204 are calculated. Because the convolutional filters 204 and word embedding results are non-changeable in the inference phrase of a natural language processor, it is possible to pre-calculate the element-wise products that are generated using the vectors representing the repeated words and the convolutional filters 204. These pre-calculated element-wise products can be cached (such as into a memory or onto a disk) and retrieved later when needed. This reduces the number of multiplications performed by the natural language processor when processing user queries. As a result, this helps to accelerate the inferencing procedure performed by the natural language processor and to reduce the response times for responding to user queries. Details of this caching functionality are provided below.

Although FIG. 2 illustrates one example of a framework 200 for natural language processing, various changes may be made to FIG. 2. For example, convolutional neural networks come can in a wide variety of configurations, and FIG. 2 does not limit this disclosure to the specific configuration shown in FIG. 2. Any suitable neural network or other computing system that supports convolution operations may use the high-frequency word sets and caches described below. Although FIG. 3 illustrates one example of convolution calculations for use in natural language processing, various changes may be made to FIG. 3. For instance, the sentence matrix 202, convolutional filter 204, and feature map 206 shown in FIG. 3 are for illustration only.

Figure 4:
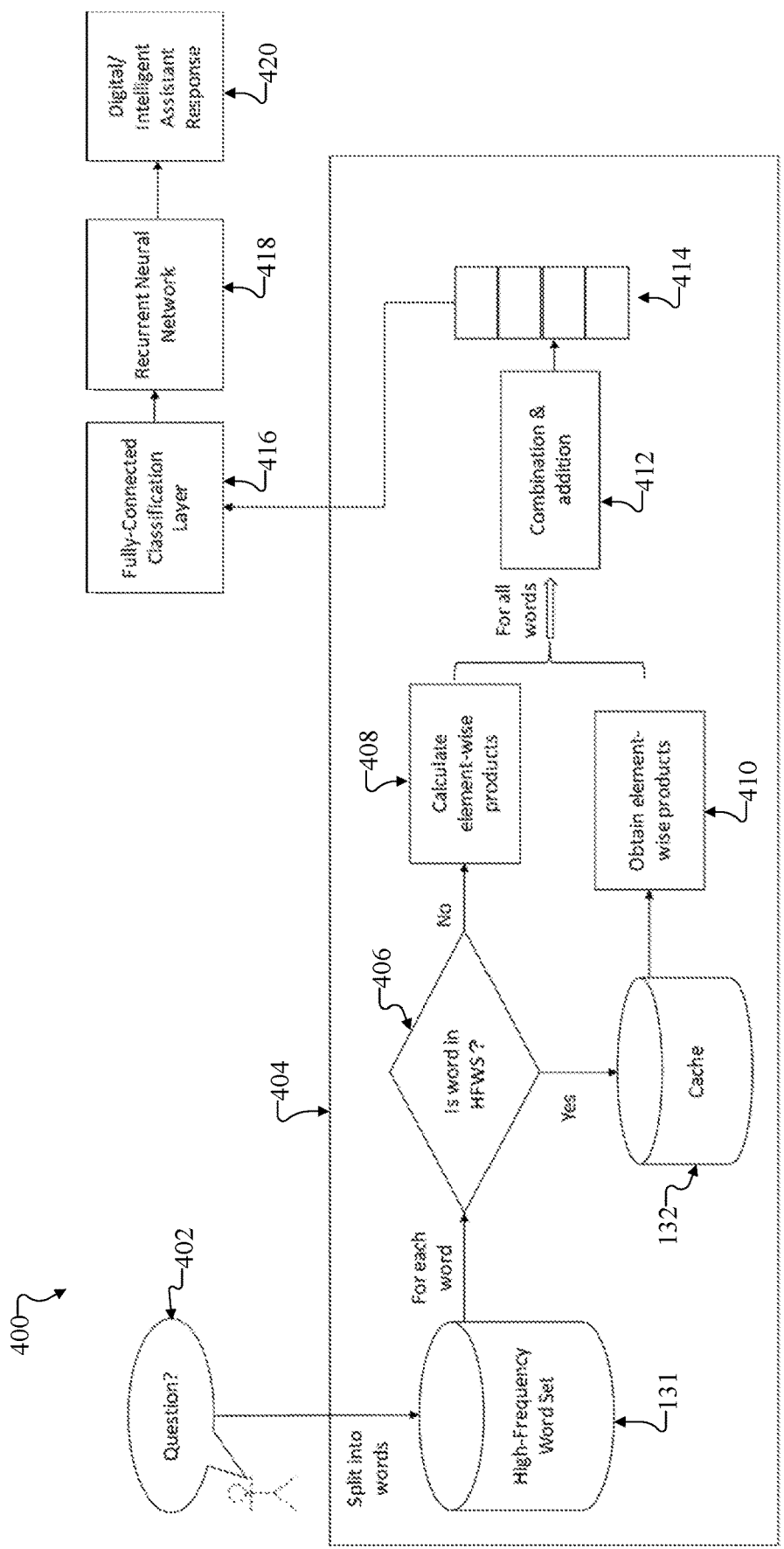
FIG. 4 illustrates an example architecture for natural language processing using a high-frequency word set and cached convolution calculation results in accordance with this disclosure.

FIG. 4 illustrates an example architecture 400 for natural language processing using a high-frequency word set and cached convolution calculation results in accordance with this disclosure. For ease of explanation, the architecture 400 shown in FIG. 4 may be described as being performed within the framework 200 shown in FIG. 2 using at least one device of the network configuration 100 shown in FIG. 1 (such as the electronic device 101, 102, 104 or server 106). However, the architecture 400 shown in FIG. 4 may be performed within any other suitable framework using any other suitable device in any other suitable system.

As shown in FIG. 4, a user query 402 can be received and processed as part of a convolution operation 404, which may be executed using one or more processors 120 of a device (such as the electronic device 101, 102, 104 or server 106). As part of this convolution operation 404 (or prior to the convolution operation 404), the user query 402 is split into words. The individual words are compared to the contents of the high-frequency word set (HFWS) 131. For each word, a determination 406 is made whether that word appears in the high-frequency word set 131. If the word is not in the high-frequency word set 131, calculations 408 occur to compute the Hadamard products or other element-wise products involving the vector for that word and the rows of the convolutional filters 204. However, if the word is in the high-frequency word set 131, this indicates that the Hadamard products or other element-wise products for that word were pre-computed and stored in the cache 132. Thus, a retrieval 410 can occur to obtain the Hadamard products or other element-wise products from the cache 132 for that word.

However the element-wise products are obtained (calculated or retrieved), the element-wise products for the words of the user query 402 can be processed using combination and additional operations 412. These operations 412 can combine the element-wise products into different combinations and sum (accumulate) the element-wise products in the different combinations (such as is shown in FIG. 3). Results 414 from the operations 412 can be processed further (such as in the manner shown in FIG. 2).

The results output by the convolution operation 404 (such as the feature vector 212 shown in FIG. 2) can be further processed, which in the example shown in FIG. 4 is done using a fully-connected classification layer 416 and a recurrent neural network 418. The fully-connected classification layer 416 generally operates to learn non-linear combinations of features and to apply those non-linear combinations to the outputs from the convolution operation 404. The recurrent neural network 418 is a type of machine-learning algorithm in which nodes are organized into layers, where the nodes in one layer are connected (using directed or one-way connections) to the nodes in the next layer. The recurrent neural network 418 operates to generate a response 420 to the user query 402, where the response 420 in this example is provided via a digital or intelligent assistant. It should be noted, however, that the architecture 400 here is not limited to use with a fully-connected classification layer 416 and a recurrent neural network 418. Outputs generated by the convolution operation 404 can be used by any other suitable component or components. Also, while the response 420 generated using the output of the convolution operation 404 is shown here as being used by a digital or intelligent assistant, outputs generated by the convolution operation 404 can be used in any other suitable manner.

Although FIG. 4 illustrates one example of an architecture 400 for natural language processing using a high-frequency word set and cached convolution calculation results, various changes may be made to FIG. 4. For example, a single high-frequency word set 131 and a single cache 132 are shown as being used here. However, as described below, it is possible to support multi-level caching of convolution calculation results in multiple caches 132, and the caches 132 may be associated with a single high-frequency word set 131 or with separate high-frequency word sets 131.

Figure 5:
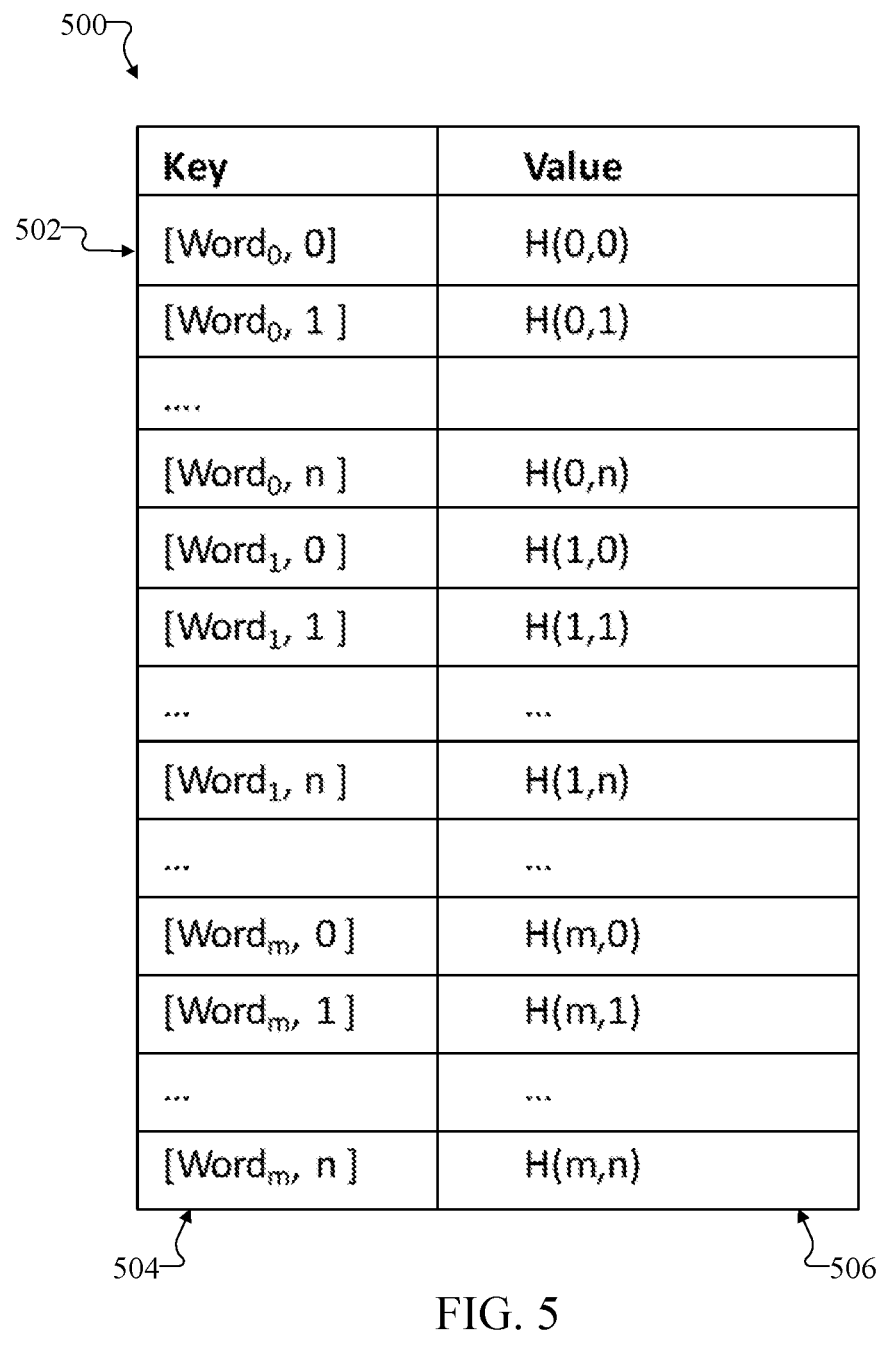

FIG. 5 illustrates an example database table 500 for caching convolution calculation results in accordance with this disclosure. The database table 500 could, for example, be used to store convolution calculation results in the cache 132. For ease of explanation, the database table 500 shown in FIG. 5 may be described as being used in the architecture 400 shown in FIG. 4 by at least one device of the network configuration 100 shown in FIG. 1 (such as the electronic device 101, 102, 104 or server 106). However, the architecture 400 shown in FIG. 4 may be used with any other suitable architecture in any other suitable device or system.

As shown in FIG. 5, the database table 500 includes various entries 502, and each entry 502 includes or is associated with an index or key 504 and a pre-computed element-wise product 506. The keys 504 can be used to access the database table 500 in order to retrieve the associated pre-computed element-wise products 506. In this example, the element-wise products 506 represent Hadamard products, and each value H(i, j) in FIG. 5 represents the Hadamard product between the embedding vector for the $i^{th}$ word in the high-frequency word set 131 and the $j^{th}$ row in the convolutional filter row set.

In some embodiments, to generate or use the keys 504, consider that there may be two sets of data described above. The first set includes the words from the high-frequency word set 131. The second set includes all rows of all convolutional filters 204, which may be collectively referred to as a convolutional filter row set (CFRS). In this example, the keys 504 are formed using a tuple that combines a specific word and the index number for a specific row of the convolutional filter row set. Thus, to generate the database table 500, the Hadamard product or other element-wise product between each of m words in the high-frequency word set 131 and each of n rows in the set of convolutional filters 204 can be determined. Those element-wise products can be stored in the database table 500 by creating the appropriate keys 504 (based on the words and row numbers) and creating entries 502 in the table 500 with those element-wise products 506. To access the database table 500, appropriate keys 504 (based on words and row numbers) can be created and used to retrieve the element-wise products 506 corresponding to those keys 504.

It should be noted here that while the keys 504 are shown as being within the entries 502, the keys 504 could be used to access the database table 500 without actually forming part of the entries 502. For example, the words and row numbers could be used to calculate values identifying specific entries 502 in the table 500, and the keys 504 could be used to retrieve the pre-computed element-wise products 506 from those specific entries 502 (without forming a part of those entries 502). It should also be noted here that the use of keys 504 based on words and row indices is for illustration only and that any other suitable mechanism can be used to access the table 500.

Although FIG. 5 illustrates one example of a database table 500 for caching convolution calculation results, various changes may be made to FIG. 5. For example, the contents and arrangement of the database table 500 are for illustration only, and pre-computed element-wise products 506 can be stored in any other suitable manner.

Figure 6:
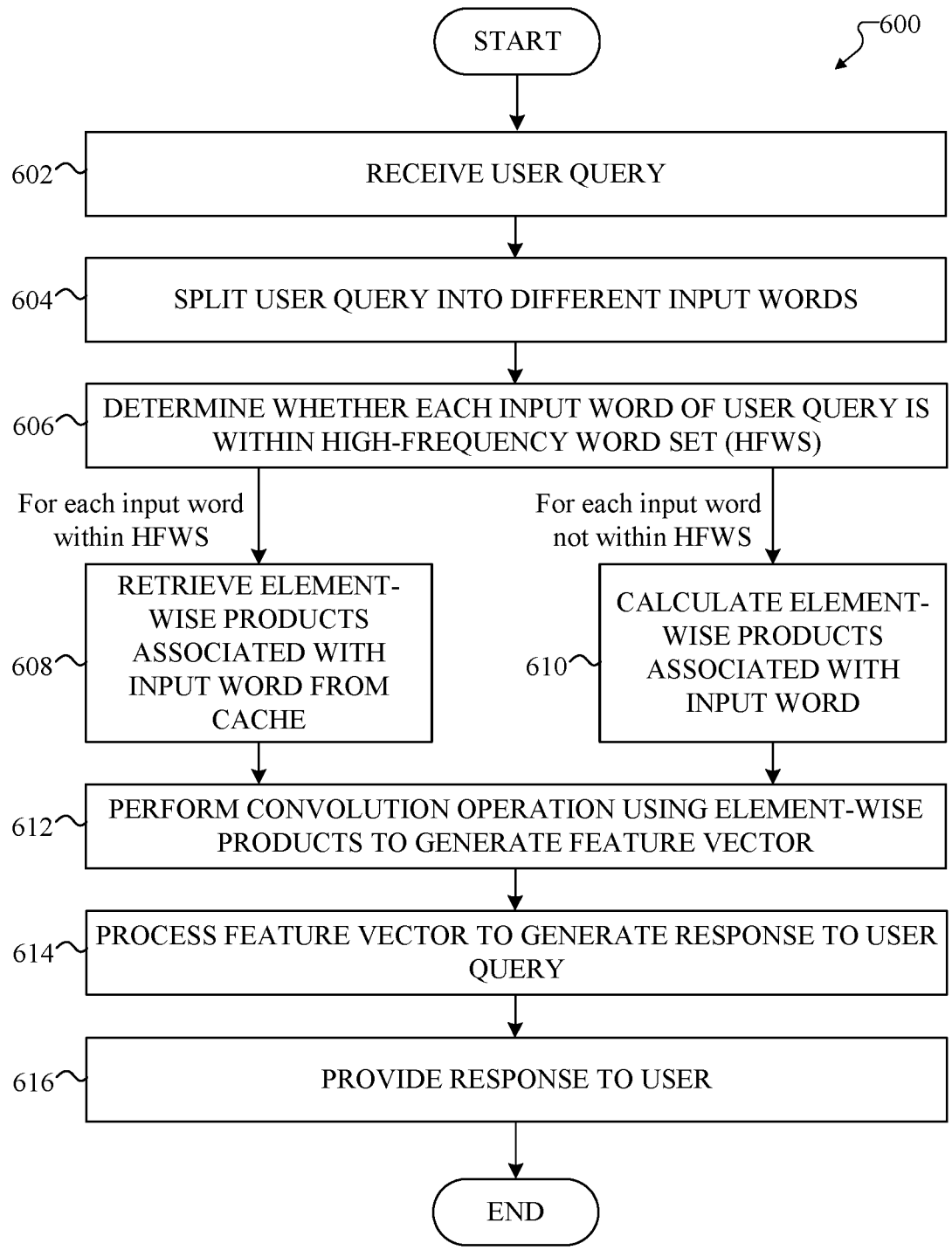
FIG. 6 illustrates an example method for natural language processing using a high-frequency word set and cached convolution calculation results in accordance with this disclosure.

FIG. 6 illustrates an example method 600 for natural language processing using a high-frequency word set and cached convolution calculation results in accordance with this disclosure. For ease of explanation, the method 600 shown in FIG. 6 may be described as being performed using the architecture 400 shown in FIG. 4 with at least one device of the network configuration 100 shown in FIG. 1 (such as the electronic device 101, 102, 104 or server 106). However, the method 600 shown in FIG. 6 may be performed using any other suitable architecture or device in any other suitable system.

As shown in FIG. 6, a user query is received at step 602, and the user query is split into different input words or other components at step 604. This could include, for example, at least one processor 120 of a device (such as the electronic device 101, 102, 104 or server 106) receiving a user query 402 (such as a spoken or typed user query). This could also include the at least one processor 120 of the device performing voice recognition if the user query 402 is submitted in a spoken or audible format. This could further include the at least one processor 120 of the device segmenting the user query 402 into individual input words and other components (if any). Note, however, that the way in which the words of the user query 402 are obtained can vary depending on the implementation. For instance, if the device performing the method 600 is an end-user device, the user query 402 may be received directly from the user. If the device performing the method 600 is a server, the user query 402 or the input words contained in the user query 402 may be received from the user's end-user device.

A determination is made whether each input word is contained in at least one high-frequency word set at step 606. This could include, for example, the at least one processor 120 of the device determining whether each input word appears in at least one high-frequency word set 131. The at least one processor 120 of the device may use any suitable technique to determine whether each input word is contained in a high-frequency word set 131. For each input word within a high-frequency word set, one or more pre-calculated element-wise products associated with the input word are retrieved from a cache at step 608. This could include, for example, the at least one processor 120 of the device retrieving one or multiple pre-calculated Hadamard products or other element-wise products from the cache 132. As noted above, in some embodiments, this may include the at least one processor 120 of the device generating keys 504 based on the input word and the row indices for the convolutional filters 204. For each input word not within a high-frequency word set, one or more element-wise products associated with the input word are calculated at step 610. This could include, for example, the at least one processor 120 of the device calculating one or multiple Hadamard products or other element-wise products using the input word and the convolutional filters 204.

In whatever manner the Hadamard products or other element-wise products are obtained, a convolution operation is performed using the element-wise products to generate a feature vector at step 612. This could include, for example, the at least one processor 120 of the device performing the various operations shown in FIG. 2 to generate the feature vector 212 based on the sentence matrix 202 and the convolutional filters 204. The feature vector is processed to generate a response to the user query at step 614, and the response is provided to the user at step 616. This could include, for example, the at least one processor 120 of the device using a fully-connected classification layer 416 and a recurrent neural network 418 to process the feature vector 212 and generate a response 420 to the user query 402. Again, note that the way in which the response 420 is provided to the user can vary depending on the implementation. For instance, if the device performing the method 600 is an end-user device, the response 420 may be provided directly to the user. If the device performing the method 600 is a server, the response 420 may be pushed or otherwise provided to an end-user device for delivery to the user.

Although FIG. 6 illustrates one example of a method 600 for natural language processing using a high-frequency word set and cached convolution calculation results, various changes may be made to FIG. 6. For example, while certain steps in FIG. 6 are shown as occurring serially and certain steps in FIG. 6 are shown as occurring in parallel, the parallel steps in FIG. 6 could occur serially, and the serial steps in FIG. 6 could overlap or occur in parallel. Also, various steps in FIG. 6 may occur in a different order or occur any number of times.

Figure 7:
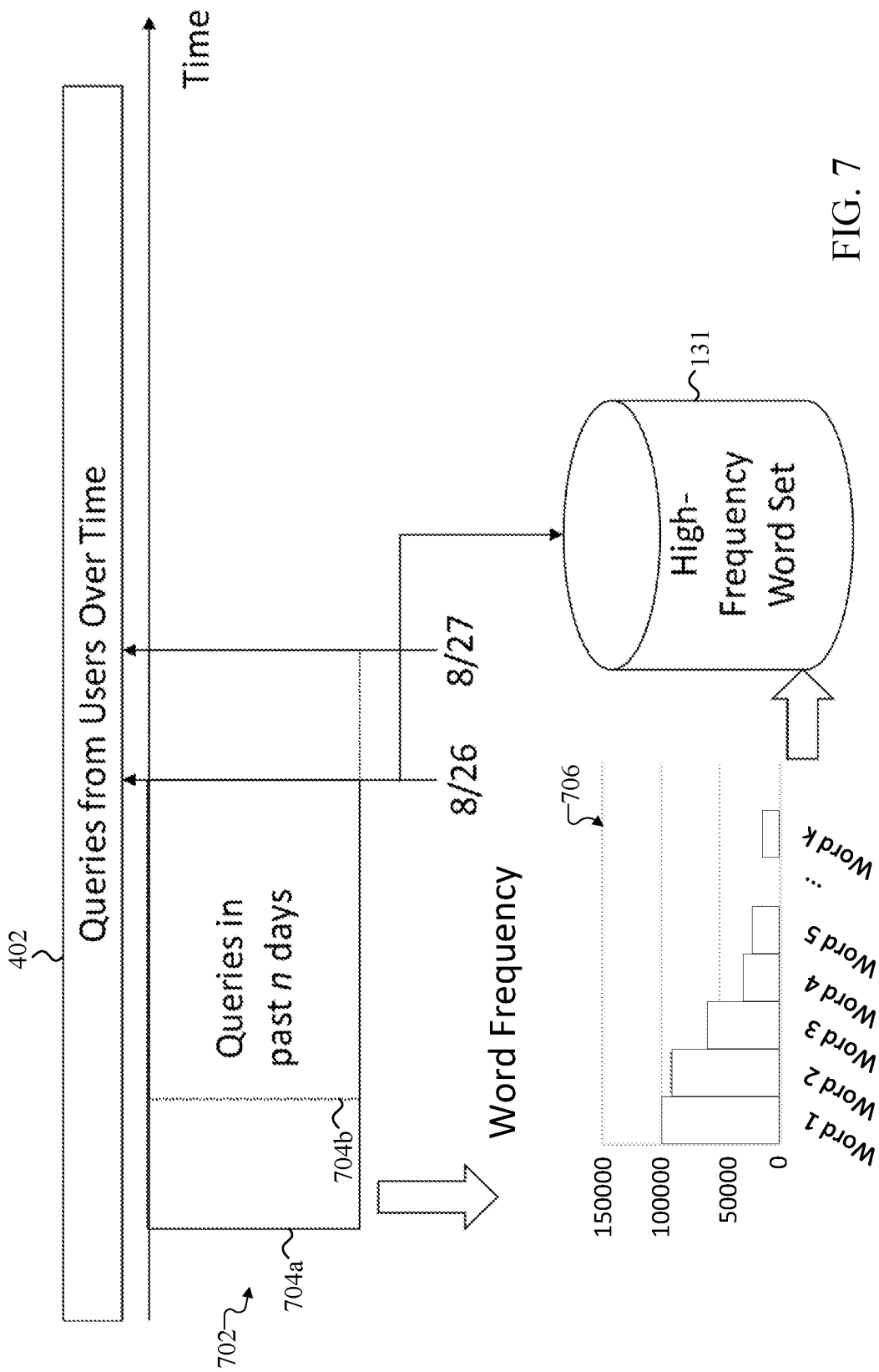
FIG. 7 illustrates an example updating of a high-frequency word set in accordance with this disclosure.

FIG. 7 illustrates an example updating of a high-frequency word set 131 in accordance with this disclosure. For ease of explanation, the updating shown in FIG. 7 may be described as being performed using at least one device of the network configuration 100 shown in FIG. 1 (such as the electronic device 101, 102, 104 or server 106). However, the updating shown in FIG. 7 may be performed using any other suitable device in any other suitable system.

As shown in FIG. 7, various user queries 402 are received over time, such as when queries from all users are received at a server 106 or other device. A sliding time window 702 is defined, which identifies a period of time in which queries 402 received during that time can be analyzed. In this example, the time window 702 extends back a number n of days from a current time, and the time window 702 can slide as time progresses to encompass different sets of user queries. For example, on one day (August 26 in this example), the time window 702 can have a first position 704a extending back n days. The next day (August 27 in this example), the time window 702 can have a second position 704b also extending back n days.

To analyze the user queries 402 within the time window 702, the server 106 or other device can determine word frequency statistics 706 for words contained in queries 402 falling within the time window 702. The word frequency statistics 706 identify the number of times that different words are used in the user queries 402 falling within the time window 702. The more-frequently used words in the user queries 402 as defined by the word frequency statistics 706 can be selected for inclusion in a high-frequency word set 131. For example, the server 106 or other device could select a specified number or percentage of the most-frequently used words for inclusion in the high-frequency word set 131. The server 106 or other device could also select any words having a frequency (number of occurrences) above a specified threshold. In general, any suitable technique could be used to select words for inclusion in the high-frequency word set 131 based on the word frequency statistics 706.

Because the word frequency statistics 706 can vary over time as the user queries 402 falling within the time window 702 change, the high-frequency word set 131 can adapt over time to changing conditions. As a result, when recent or other trending events occur and lead to changes in the user queries 402 being submitted, the high-frequency word set 131 can also be adapted to the changing conditions. Note that the word frequency statistics 706 can be calculated and the high-frequency word set 131 can be updated continuously, periodically (such as hourly, daily, or at another interval), in response to certain events, or at any other suitable times. Thus, the high-frequency word set 131 can be updated over time by adding additional words to the high-frequency word set 131 (as those words become more frequent in the user queries 402) and removing existing words from the high-frequency word set 131 (as those words become less frequent in the user queries 402). As the high-frequency word set 131 is updated, the associated cache 132 can be updated by adding pre-computed element-wise products 506 for the additional words added to the high-frequency word set 131 and by removing the pre-computed element-wise products 506 for the existing words removed from the high-frequency word set 131.

Although FIG. 7 illustrates one example of updating a high-frequency word set 131, various changes may be made to FIG. 7. For example, a high-frequency word set 131 can be updated in any other suitable manner. Also, the size of the time window 702 can be fixed or variable, and the time window 702 can move in any suitable manner (such as continuously or in fixed increments).

Figure 8:
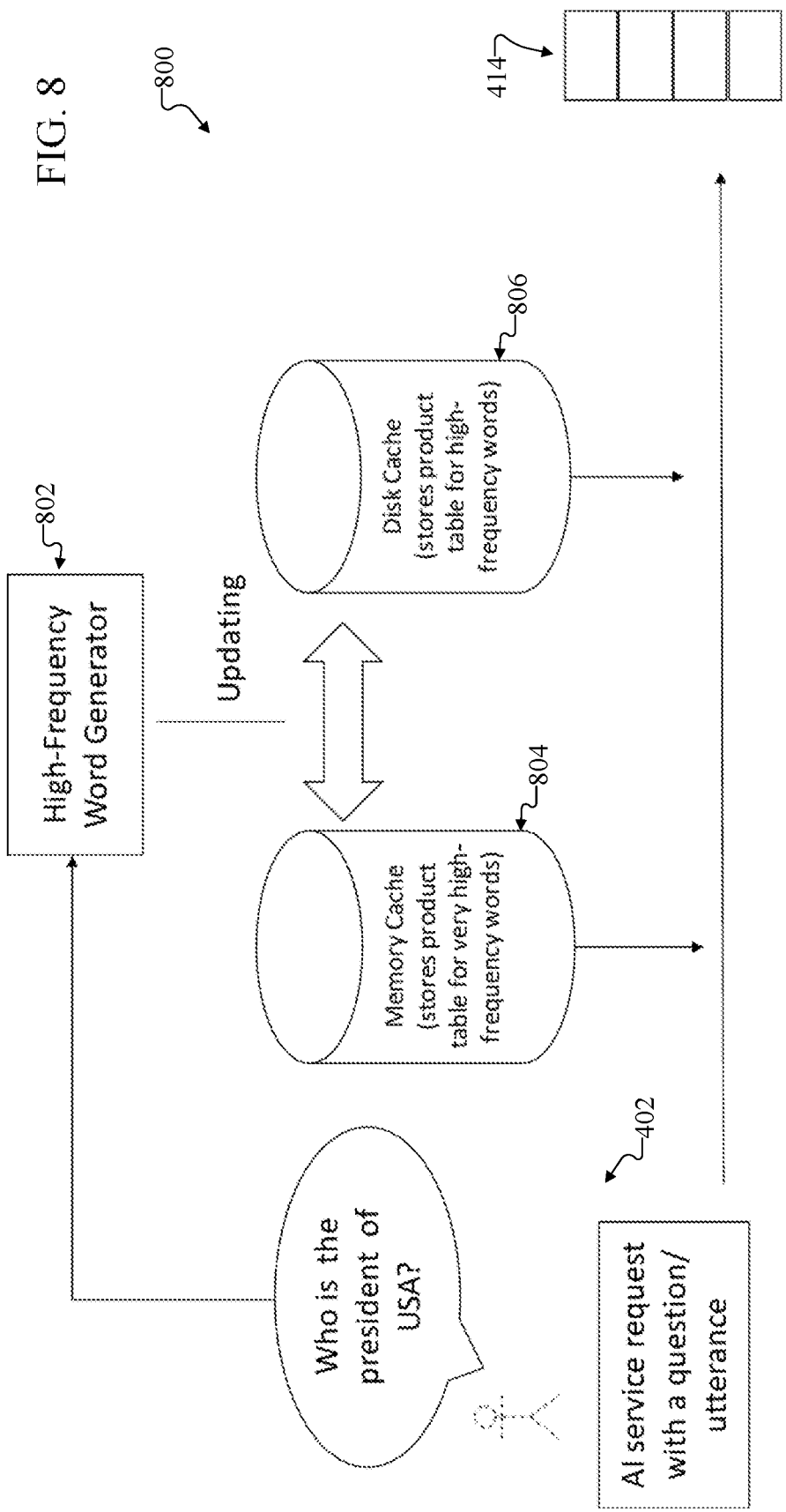
FIG. 8 illustrates an example multi-level caching mechanism for caching convolution calculation results in accordance with this disclosure.

FIG. 8 illustrates an example multi-level caching mechanism 800 for caching convolution calculation results in accordance with this disclosure. For ease of explanation, the multi-level caching mechanism 800 shown in FIG. 8 may be described as being implemented using at least one device of the network configuration 100 shown in FIG. 1 (such as the electronic device 101, 102, 104 or server 106). However, the multi-level caching mechanism 800 shown in FIG. 8 may be implemented using any other suitable device in any other suitable system.

As shown in FIG. 8, user queries 402 can be processed to generate convolution results 414 as described above. The user queries 402 can also be provided to a high-frequency word generator 802, which processes the user queries 402 to generate and update one or more high-frequency word sets 131. For example, the high-frequency word generator 802 could be executed by a server 106 or other device configured to process user queries. Hadamard products or other element-wise products associated with the words in the high-frequency word set(s) 131 can then be stored in different caches, and the different caches can be associated with different frequencies of use.

In this example, the caches include two different caches 804 and 806. The cache 804 stores element-wise products associated with very high-frequency words in the user queries 402, while the cache 806 stores element-wise products associated with high-frequency words in the user queries 402 (which occur less frequently than the very high-frequency words). In some embodiments, the cache 804 can be stored in a memory (such as a random access memory or other volatile memory), and the cache 806 can be stored in a disk (such as a hard drive). The memory can help to facilitate faster retrieval of Hadamard products or other element-wise products, and the disk can help to facilitate somewhat slower retrieval of Hadamard products or other element-wise products. Also, the memory can be smaller and store a smaller number of values, and the disk can be larger and store a larger number of values.

Note that the different caches 804 and 806 shown here may or may not be used by the same device to process the user queries 402. In some embodiments, for example, the caches 804 and 806 may be accessible to a common device (such as the server 106) and used to process user queries 402 from multiple devices. In these embodiments, one or multiple high-frequency word sets 131 can be associated with the caches 804 and 806 and used to determine whether element-wise products are stored in the caches 804 and 806. In other embodiments, copies of the cache 804 could be pushed or otherwise provided to end-user electronic devices (such as by the server 106) or other devices, while the cache 806 is used by the server 106. In those embodiments, different devices could use different high-frequency word sets 131 to determine whether element-wise products are stored in their respective caches 804 and 806. In general, if a multi-level caching mechanism is used, different caches may be centralized or distributed in any suitable manner.

Although FIG. 8 illustrates one example of a multi-level caching mechanism 800 for caching convolution calculation results, various changes may be made to FIG. 8. For example, a multi-level caching mechanism 800 may include more than two caches, and these caches may be used to store element-wise products associated with words having different frequencies in the user queries 402. However, as described above, a single cache 132 may also be used.

Figure 9:
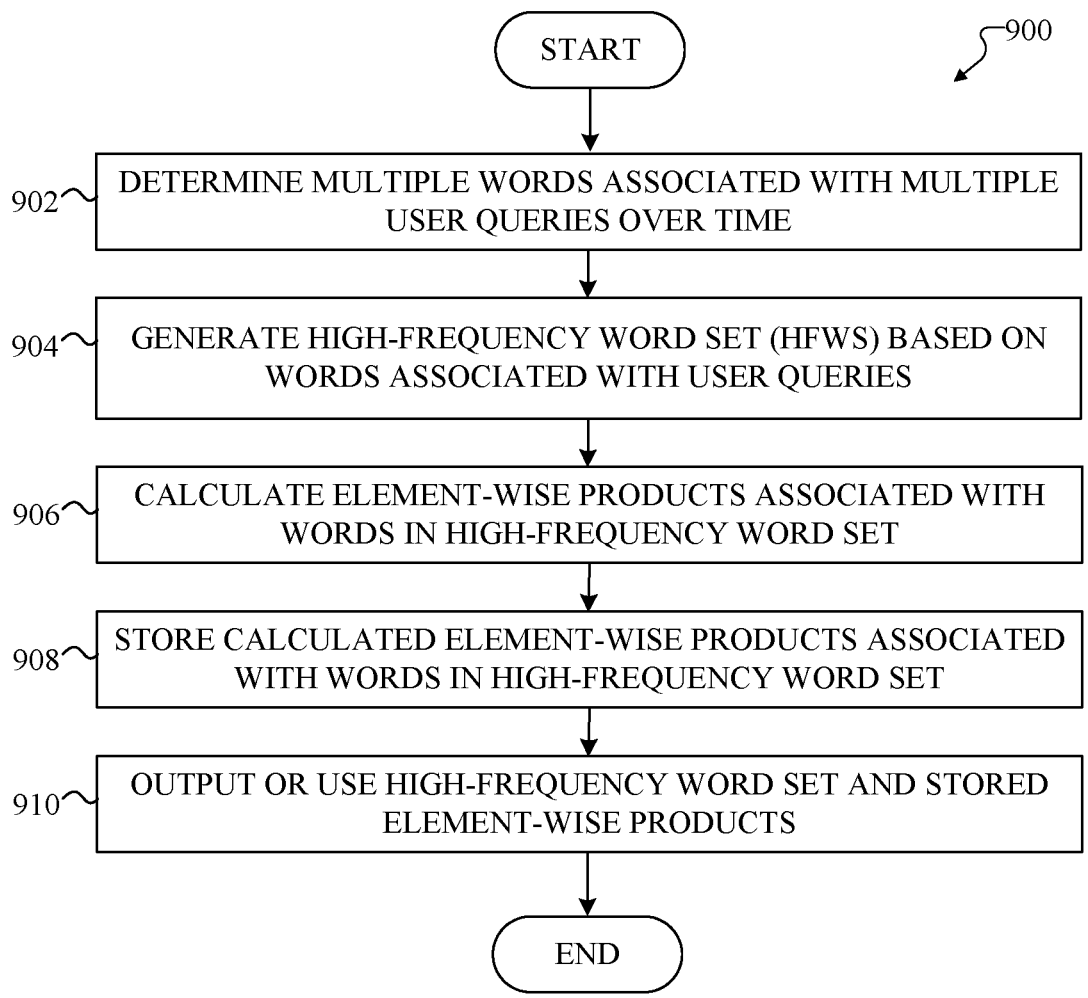
FIG. 9 illustrates an example method for updating a high-frequency word set and cached convolution calculation results in accordance with this disclosure.

FIG. 9 illustrates an example method 900 for updating a high-frequency word set and cached convolution calculation results in accordance with this disclosure. For ease of explanation, the method 900 shown in FIG. 9 may be described as being performed using at least one device of the network configuration 100 shown in FIG. 1 (such as the electronic device 101, 102, 104 or server 106). However, the method 900 shown in FIG. 9 may be performed using any other suitable device in any other suitable system.

As shown in FIG. 9, multiple words associated with user queries received over time are determined at step 902, and at least one high-frequency word set is generated based on the words associated with the user queries at step 904. This could include, for example, at least one processor 120 of a device (such as the electronic device 101, 102, 104 or server 106) receiving multiple user queries 402 (such as spoken or typed user queries) and identifying word frequency statistics 706 for words in user queries 402 received within a given time window 702. This could also include the at least one processor 120 of the device identifying frequently-used words in the user queries 402 or identifying very high-frequency and high-frequency words in the user queries 402 (or other frequencies of word usage).

Element-wise products associated with the words in the high-frequency word set(s) are calculated at step 906. This could include, for example, the at least one processor 120 of the device calculating Hadamard products or other element-wise products using vectors representing the words in the high-frequency word set(s) 131 and rows of the convolutional filters 204. The calculated element-wise products associated with the words in the high-frequency word set(s) are stored at step 908. This could include, for example, the at least one processor 120 of the device storing the calculated Hadamard products or other element-wise products 506 in a database table 500.

The high-frequency word set(s) and stored element-wise products are output or used in some manner at step 910. This could include, for example, the at least one processor 120 of the device using the stored element-wise products 506 to perform convolutional operations in the manner described above. This could also include the at least one processor 120 of the device pushing or otherwise providing the high-frequency word set(s) 131 and the stored element-wise products 506 to other devices that can perform convolutional operations. As a particular example, this could include the server 106 providing the high-frequency word set(s) 131 and the stored element-wise products 506 to end-user devices, such as electronic devices like mobile smartphones, tablet computers, laptop computers, or other devices.

Although FIG. 9 illustrates one example of a method 900 for updating a high-frequency word set and cached convolution calculation results, various changes may be made to FIG. 9. For example, while shown as a series of steps, various steps in FIG. 9 could overlap, occur in parallel, occur in a different order, or occur any number of times.

The embodiments described above are not meant to be limiting and are merely illustrative of various aspects of this disclosure. While example embodiments may be indicated as applicable to a particular device category (such as mobile devices, servers, etc.), the processes and examples provided above are not intended to be solely limited to those device categories and can be broadly applicable to various device categories (such as appliances, computers, automobiles, smart speakers, IoT devices, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   determining, using at least one processor, input words associated with a user query;
   for each of one or more of the input words that are contained in a high-frequency word set, retrieving pre-computed element-wise products associated with the input word from a cache;
   performing, using the at least one processor, a convolution operation using the pre-computed element-wise products; and
   generating, using the at least one processor, a response to the user query based on results of the convolution operation.

2. The method of claim 1, further comprising:
   for each of one or more of the input words that are not contained in the high-frequency word set, calculating additional element-wise products associated with the input word;
   wherein performing the convolution operation comprises performing the convolution operation using the pre-computed element-wise products and the additional element-wise products.

3. The method of claim 1, wherein each of the element-wise products comprises a Hadamard product of a vector associated with one of the input words and a row of a convolution filter.

4. The method of claim 1, further comprising:
   updating the high-frequency word set by adding words to and removing words from the high-frequency word set; and
   updating the cache by adding pre-computed element-wise products for the added words and removing the pre-computed element-wise products for the removed words.

5. The method of claim 1, wherein:
   the results of the convolution operation comprise a feature vector; and
   generating the response to the user query comprises processing the feature vector using a fully-connected classification layer and a recurrent neural network.

6. An apparatus comprising:
   at least one memory configured to store a high-frequency word set and a cache of pre-computed element-wise products associated with words in the high-frequency word set; and
   at least one processor coupled to the at least one memory, the at least one processor configured to:
   determine input words associated with a user query;
   for each of one or more of the input words that are contained in the high-frequency word set, retrieve the pre-computed element-wise products associated with the input word from the cache;
   perform a convolution operation using the pre-computed element-wise products; and
   generate a response to the user query based on results of the convolution operation.

7. The apparatus of claim 6, wherein:
   the at least one processor is further configured, for each of one or more of the input words that are not contained in the high-frequency word set, to calculate additional element-wise products associated with the input word; and
   the at least one processor is configured to perform the convolution operation using the pre-computed element-wise products and the additional element-wise products.

8. The apparatus of claim 6, wherein each of the element-wise products comprises a Hadamard product of a vector associated with one of the input words and a row of a convolution filter.

9. The apparatus of claim 6, wherein the at least one processor is further configured to:
   update the high-frequency word set by adding words to and removing words from the high-frequency word set; and
   update the cache by adding pre-computed element-wise products for the added words and removing the pre-computed element-wise products for the removed words.

10. The apparatus of claim 6, wherein:
    the results of the convolution operation comprise a feature vector; and
    the at least one processor is configured to process the feature vector using a fully-connected classification layer and a recurrent neural network to generate the response to the user query.

11. A non-transitory computer readable medium containing computer readable program code that, when executed, causes an electronic device to:
    determine input words associated with a user query;
    for each of one or more of the input words that are contained in a high-frequency word set, retrieve pre-computed element-wise products associated with the input word from a cache;
    perform a convolution operation using the pre-computed element-wise products; and
    generate a response to the user query based on results of the convolution operation.

12. The non-transitory computer readable medium of claim 11, wherein:
    the computer readable program code when executed further causes the electronic device, for each of one or more of the input words that are not contained in the high-frequency word set, to calculate additional element-wise products associated with the input word; and
    the computer readable program code when executed causes the electronic device to perform the convolution operation using the pre-computed element-wise products and the additional element-wise products.

13. The non-transitory computer readable medium of claim 11, wherein each of the element-wise products comprises a Hadamard product of a vector associated with one of the input words and a row of a convolution filter.

14. The non-transitory computer readable medium of claim 11, wherein the computer readable program code when executed further causes the electronic device to:
    update the high-frequency word set by adding words to and removing words from the high-frequency word set; and
    update the cache by adding pre-computed element-wise products for the added words and removing the pre-computed element-wise products for the removed words.

15. The non-transitory computer readable medium of claim 11, wherein:
    the results of the convolution operation comprise a feature vector; and
    the computer readable program code when executed causes the electronic device to process the feature vector using a fully-connected classification layer and a recurrent neural network to generate the response to the user query.

16. A method comprising:
identifying, using at least one processor, multiple words associated with multiple user queries;
generating, using the at least one processor, a high-frequency word set based on the words associated with the user queries, the high-frequency word set identifying more frequently-used words in the user queries;
calculating, using the at least one processor, element-wise products associated with the words in the high-frequency word set and convolution filters;
storing the calculated element-wise products; and
using the at least one processor, at least one of:
  using the stored element-wise products to process additional user queries and generate responses for the additional user queries; and
  providing the stored element-wise products to one or more devices configured to process the additional user queries and generate the responses for the additional user queries.

17. The method of claim 16, wherein each of the calculated element-wise products comprises a Hadamard product of a vector associated with one of the words in the high-frequency word set and a row of one of the convolution filters.

18. The method of claim 16, further comprising:
updating the high-frequency word set by adding words to and removing words from the high-frequency word set; and
calculating additional element-wise products associated with the added words.

19. The method of claim 18, wherein updating the high-frequency word set comprises updating the high-frequency word set based on user queries received within a sliding window of time.

20. The method of claim 16, wherein a server identifies the words associated with the user queries, identifies the high-frequency word set, calculates and stores the element-wise products, and pushes at least some of the stored element-wise products to end-user devices so that the end-user devices are able to use the element-wise products during convolution operations.

* * * * *